United States Patent
Lo et al.

(10) Patent No.: US 10,968,391 B2
(45) Date of Patent: *Apr. 6, 2021

(54) LIQUID CRYSTAL COMPOSITION AND LIQUID CRYSTAL DISPLAY INCLUDING THE SAME (II)

(71) Applicant: DAXIN MATERIALS CORP., Taichung (TW)

(72) Inventors: Chih-Yuan Lo, Taichung (TW); Chung-Hsien Wu, Taichung (TW); Chen Wang, Taichung (TW); Chun-Chih Wang, Taichung (TW)

(73) Assignee: DAXIN MATERIALS CORP., Taichung (TW)

( * ) Notice: Subject to any disclaimer, the term of this patent is extended or adjusted under 35 U.S.C. 154(b) by 65 days.

This patent is subject to a terminal disclaimer.

(21) Appl. No.: 16/403,215

(22) Filed: May 3, 2019

(65) Prior Publication Data

US 2019/0338188 A1   Nov. 7, 2019

(30) Foreign Application Priority Data

May 7, 2018  (TW) ................. 107115444

(51) Int. Cl.
  *G02F 1/1337*  (2006.01)
  *C09K 19/38*  (2006.01)
  *G02F 1/137*  (2006.01)

(52) U.S. Cl.
  CPC ...... *C09K 19/3861* (2013.01); *C09K 19/3852* (2013.01); *G02F 1/137* (2013.01); *G02F 1/13775* (2021.01)

(58) Field of Classification Search
  CPC . C09K 19/3861; C09K 19/3852; G02F 1/137; G02F 1/1337; G02F 2001/13775
  USPC ...................................... 252/299.62
  See application file for complete search history.

(56) References Cited

U.S. PATENT DOCUMENTS

2019/0338188 A1*  11/2019  Lo .................. C09K 19/3861
2019/0338191 A1*  11/2019  Lo .................. C09K 19/406

FOREIGN PATENT DOCUMENTS

JP   2019196474 A   11/2019
WO  2014123056 A1   2/2017

OTHER PUBLICATIONS

Office Action issued to Japanese counterpart application No. 2019-085336 by the JPO dated Jun. 9, 2020.
C. Tschierske; G. Pelzl; S. Diele, Angew. Chem., vol. 116, 2004, pp. 6340-6368.
Pure Appl. Chem., vol. 73, No. 5, 2001, pp. 888.

* cited by examiner

*Primary Examiner* — Geraldina Visconti
(74) *Attorney, Agent, or Firm* — TraskBritt

(57) ABSTRACT

A liquid crystal composition includes at least one of a monofunctional compound represented by Formula (1) defined herein and a monofunctional compound represented by Formula (2) defined herein, and at least one of a difunctional compound represented by Formula (3) defined herein and a multifunctional compound represented by Formula (4) defined herein.

11 Claims, No Drawings

LIQUID CRYSTAL COMPOSITION AND LIQUID CRYSTAL DISPLAY INCLUDING THE SAME (II)

CROSS-REFERENCE TO RELATED APPLICATION

This application claims the benefit of the priority date of Taiwanese Patent Application No. 107115444, filed on May 7, 2018, the disclosure of which is incorporated herein in its entirety by this reference.

FIELD

The disclosure relates to a liquid crystal composition, and more particularly to a liquid crystal composition for a liquid crystal display without a liquid crystal alignment film. The liquid crystal composition can also be used for a liquid crystal display having a liquid crystal alignment film.

BACKGROUND

Liquid crystal displays have been gradually developed from those having small-sized liquid crystal panels (for example, clocks, watches, calculators, and the like) to those having large-sized liquid crystal panels (for example, liquid crystal televisions, commercial billboards, and the like). With the increasing demand for enlarging the size of the liquid crystal panels, various liquid crystal display modes have been developed, which include a twisted nematic (TN) mode, a super-twisted nematic (STN) mode, a vertical alignment (VA) mode using a thin film transistor (TFT), an in-plane switching (IPS) mode, and the like.

The liquid crystal compositions having a negative value of the dielectric anisotropy ($\Delta\varepsilon$) are usually used for the VA mode liquid crystal displays, which are primarily used for liquid crystal televisions. In order to satisfy properties such as a low driving voltage, a fast response speed, a wide operating temperature range, and the like, the liquid crystal compositions are usually required to have a high absolute value of dielectric anisotropy ($\Delta\varepsilon$), a low viscosity, and a high clearing point ($T_{ni}$). In addition, the value of the optical anisotropy ($\Delta n$) of the liquid crystal compositions is required to be adjusted according to a product value of the optical anisotropy ($\Delta n$) and a cell gap (d) along with the cell gap. When the liquid crystal displays are used for the liquid crystal televisions, a fast response speed of the liquid crystal compositions used in the liquid crystal displays is achieved by reducing a rotational viscosity ($\gamma 1$) of the liquid crystal compositions.

A polymer sustained alignment (PSA) mode liquid crystal display component, which includes a polymer stabilized (PS) mode display component, has been developed. The process for preparing the PSA mode liquid crystal display component involves adding a minor amount of a polymerizable compound into a liquid crystal composition, introducing the liquid crystal composition added with the polymerizable compound into a liquid crystal cell, applying a voltage between electrodes and irradiating active energy rays to the liquid crystal composition so as to subject the polymerizable compound to polymerization. The PSA liquid crystal display component can provide proper pretilt angles in the divided pixels such that a contrast ratio can be increased by enhancing light transmittance, and a response speed can be increased by uniformizing the pretilt angles.

The PSA liquid crystal display component still includes vertical alignment films respectively provided to the substrates. In order to simplify the process, reduce the cost, and increase the yield for the PSA liquid crystal display component, the step of omitting the formation of the vertical alignment films (i.e., to prepare a liquid crystal display component without an alignment film) has been proposed. Although the liquid crystal display component without an alignment film may have an enhanced light transmittance, an increased contrast ratio, and a fast response speed, an uneven display problem may still occur. Therefore, there is a need for further research on the liquid crystal compound and the polymerizable compound used for a liquid crystal composition.

In the liquid crystal display component without an alignment film, the alignment of the liquid crystal molecules will be controlled by the polymerizable compound after polymerization. In order to fulfill the requirement of providing the liquid crystal molecules with uniform and stable alignment, the polymerizable compound is required to have a good stability after polymerization.

Therefore, it is still desirable to develop a polymerizable compound and a liquid crystal composition including the polymerizable compound for the liquid crystal display component without an alignment film, in order to meet the application requirement of the liquid crystal display.

SUMMARY

Therefore, a first object of the disclosure is to provide a liquid crystal composition which is useful for a liquid crystal display without an alignment film.

A second object of the disclosure is to provide a liquid crystal display which includes the liquid crystal composition.

According to a first aspect of the disclosure, there is provided a liquid crystal composition which includes:

at least one monofunctional compound selected from the group consisting of a monofunctional compound represented by Formula (1) and a monofunctional compound represented by Formula (2), and at least one multifunctional compound selected from the group consisting of a difunctional compound represented by Formula (3) and a multifunctional compound represented by Formula (4),

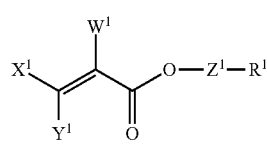

(1)

-continued

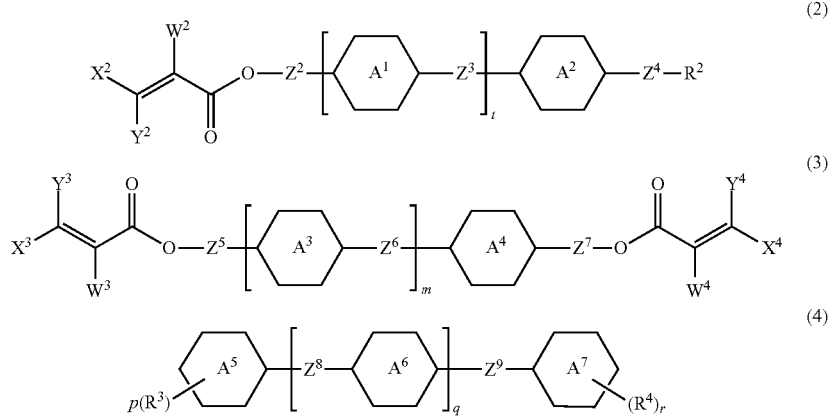

wherein
R³ represents a radical of

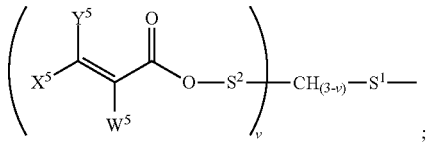

R⁴ represents a radical of

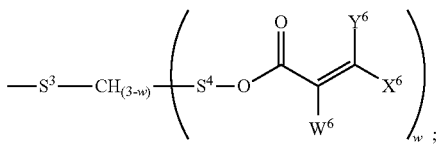

$X^1$ to $X^6$, $Y^1$ to $Y^6$, and $W^1$ to $W^6$ each, independently of one another, represent hydrogen, hydroxyl, halogen, a $C_1$-$C_{15}$ straight alkyl group, a $C_3$-$C_{15}$ branched alkyl group, a $C_2$-$C_{15}$ straight alkenyl group, a $C_3$-$C_{15}$ branched alkenyl group, a $C_2$-$C_{15}$ straight alkynyl group, or a $C_4$-$C_{15}$ branched alkynyl group, wherein each of the $C_1$-$C_{15}$ straight alkyl group, the $C_3$-$C_{15}$ branched alkyl group, the $C_2$-$C_{15}$ straight alkenyl group, the $C_3$-$C_{15}$ branched alkenyl group, the $C_2$-$C_{15}$ straight alkynyl group, and the $C_4$-$C_{15}$ branched alkynyl group is unsubstituted or substituted with at least one radical selected from the group consisting of halogen and hydroxyl, and at least one —$CH_2$— group in each of the $C_1$-$C_{15}$ straight alkyl group, the $C_3$-$C_{15}$ branched alkyl group, the $C_2$-$C_{15}$ straight alkenyl group, the $C_3$-$C_{15}$ branched alkenyl group, the $C_2$-$C_{15}$ straight alkynyl group, and the $C_4$-$C_{15}$ branched alkynyl group is optionally replaced with a ring radical;

$Z^1$ to $Z^9$ are each, independently of one another, selected from the group consisting of a single bond and a spacer group;

rings $A^1$ to $A^7$ each, independently of one another, represent 1,4-phenylene, 1,4-cyclohexylene, 1,4-cyclohexenylene, pyridine-2,5-diyl, pyrimidine-2,5-diyl, naphthalene-2,6-diyl, naphthalene-1,4-diyl, tetrahydronaphthalene-2,6-diyl, 1,3-dioxane-2,5-diyl, benzofuran-2,5-diyl, tetrahydropyran-2,5-diyl, a divalent dioxa-bicyclo[2.2.2]octyl functional group, a divalent trioxa-bicyclo[2.2.2]octyl functional group, or indane-2,5-diyl, each of which is unsubstituted or substituted with at least one radical selected from the group consisting of a $C_1$-$C_8$ alkyl group, a $C_1$-$C_8$ haloalkyl group, a $C_1$-$C_8$ alkoxyl group, halogen, a cyano group, and a nitro group;

$R^1$ and $R^2$ each, independently of one another, represent a $C_1$-$C_{70}$ straight alkyl group, a $C_3$-$C_{70}$ branched alkyl group, a $C_2$-$C_{70}$ straight alkenyl group, a $C_3$-$C_{70}$ branched alkenyl group, a $C_2$-$C_{70}$ straight alkynyl group, or a $C_4$-$C_{70}$ branched alkynyl group, wherein each of the $C_1$-$C_{70}$ straight alkyl group, the $C_3$-$C_{70}$ branched alkyl group, the $C_2$-$C_{70}$ straight alkenyl group, the $C_3$-$C_{70}$ branched alkenyl group, the $C_2$-$C_{70}$ straight alkynyl group, and the $C_4$-$C_{70}$ branched alkynyl group is unsubstituted or substituted with at least one halogen atom, and at least one —$CH_2$— group in each of the $C_1$-$C_{70}$ straight alkyl group, the $C_3$-$C_{70}$ branched alkyl group, the $C_2$-$C_{70}$ straight alkenyl group, the $C_3$-$C_{70}$ branched alkenyl group, the $C_2$-$C_{70}$ straight alkynyl group, and the $C_4$-$C_{70}$ branched alkynyl group is optionally replaced with a first divalent radical selected from the group consisting of —$SiR^a_2$—, —O—, —CO—, —COO—, and —OCO—, wherein $R^a$ represents hydrogen, a $C_1$-$C_4$ straight alkyl group, or a $C_3$-$C_4$ branched alkyl group, with the proviso that when at least two of the —$CH_2$— groups are replaced with the first divalent radicals, the first divalent radicals are not bonded to each other directly, at least one of $Z^1$ and $R^1$ contains —$SiR^a_2$—, and at least one of $Z^2$, $Z^3$, $Z^4$, and $R^2$ contains —$SiR^a_2$—;

$S^1$ to $S^4$ each, independently of one another, represent a single bond, a $C_1$-$C_{12}$ straight alkylene group, a $C_3$-$C_{12}$ branched alkylene group, a $C_2$-$C_{12}$ straight alkenylene group, or a $C_3$-$C_{12}$ branched alkenylene group, wherein at least one —$CH_2$— group in each of the $C_1$-$C_{12}$ straight alkylene group, the $C_3$-$C_{12}$ branched alkylene group, the $C_2$-$C_{12}$ straight alkenylene group, and the $C_3$-$C_{12}$ branched alkenylene group is optionally replaced with a second divalent radical selected from the group consisting of —O—, —CO—, —COO—, and —OCO—, with the proviso that when at least two of the —$CH_2$— groups are replaced with the second divalent radicals, the second divalent radicals are not bonded to each other directly;

t is an integer ranging from 1 to 2, provided that when t is 2, two A's are the same or different and two $Z^3$s are the same or different;

m is an integer ranging from 0 to 2, provided that when m is 2, two $A^3$s are the same or different and two $Z^6$s are the same or different;

v is an integer ranging from 1 to 2, provided that when v is 2, two $S^2$s are the same or different, two $W^5$s are the same or different, two $X^5$s are the same or different, and two $Y^5$s are the same or different;

w is an integer ranging from 1 to 2, provided that when w is 2, two $S^4$s are the same or different, two $W^6$s are the same or different, two $X^6$s are the same or different, and two $Y^6$s are the same or different;

each of p and r is an integer ranging from 0 to 3, and a sum of p and r is an integer ranging from 3 to 6 provided that when p is 2 or 3, a plurality of $R^3$s are the same or different, and when r is 2 or 3, a plurality of $R^4$s are the same or different; and q is an integer ranging from 0 to 4, provided that when q is an integer ranging from 2 to 4, a plurality of $Z^8$s are the same or different and a plurality of $A^6$s are the same or different.

According to a second aspect of the disclosure, there is provided a liquid crystal display, which includes the liquid crystal composition of the first aspect of the disclosure.

The liquid crystal composition of the disclosure includes a specific combination of the monofunctional compound and the multifunctional compound defined herein, and thus exhibits an excellent vertical alignment and is suitable for a liquid crystal display without an alignment film.

DETAILED DESCRIPTION

A liquid crystal composition according to the disclosure includes:

at least one monofunctional compound selected from the group consisting of a monofunctional compound represented by Formula (1) and a monofunctional compound represented by Formula (2), and at least one multifunctional compound selected from the group consisting of a difunctional compound represented by Formula (3) and a multifunctional compound represented by Formula (4),

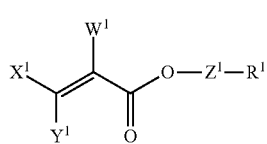
(1)

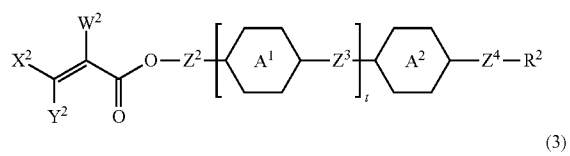
(2)

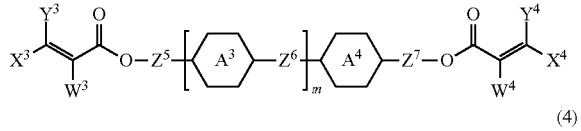
(3)

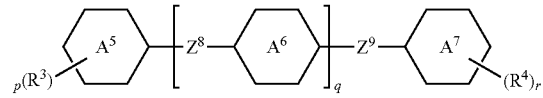
(4)

wherein
$R^3$ represents a radical of

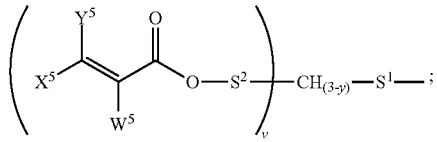

$R^4$ represents a radical of

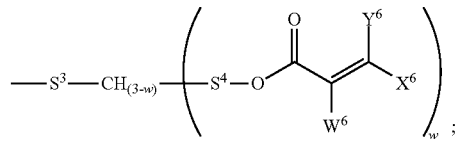

$X^1$ to $X^6$, $Y^1$ to $Y^6$, and $W^1$ to $W^6$ each, independently of one another, represent hydrogen, hydroxyl, halogen, a $C_1$-$C_{15}$ straight alkyl group, a $C_3$-$C_{15}$ branched alkyl group, a $C_2$-$C_{15}$ straight alkenyl group, a $C_3$-$C_{15}$ branched alkenyl group, a $C_2$-$C_{15}$ straight alkynyl group, or a $C_4$-$C_{15}$ branched alkynyl group, wherein each of the $C_1$-$C_{15}$ straight alkyl group, the $C_3$-$C_{15}$ branched alkyl group, the $C_2$-$C_{15}$ straight alkenyl group, the $C_3$-$C_{15}$ branched alkenyl group, the $C_2$-$C_{15}$ straight alkynyl group, and the $C_4$-$C_{15}$ branched alkynyl group is unsubstituted or substituted with at least one radical selected from the group consisting of halogen and hydroxyl, and at least one —$CH_2$— group in each of the $C_1$-$C_{15}$ straight alkyl group, the $C_3$-$C_{15}$ branched alkyl group, the $C_2$-$C_{15}$ straight alkenyl group, the $C_3$-$C_{15}$ branched alkenyl group, the $C_2$-$C_{15}$ straight alkynyl group, and the $C_4$-$C_{15}$ branched alkynyl group is optionally replaced with a ring radical;

$Z^1$ to $Z^9$ are each, independently of one another, selected from the group consisting of a single bond and a spacer group;

rings $A^1$ to $A^7$ each, independently of one another, represent 1,4-phenylene, 1,4-cyclohexylene, 1,4-cyclohexenylene, pyridine-2,5-diyl, pyrimidine-2,5-diyl, naphthalene-2,6-diyl, naphthalene-1,4-diyl, tetrahydronaphthalene-2,6-diyl, 1,3-dioxane-2,5-diyl, benzofuran-2,5-diyl, tetrahydropyran-2,5-diyl, a divalent dioxa-bicyclo[2.2.2]octyl functional group, a divalent trioxa-bicyclo[2.2.2]octyl functional group, or indane-2,5-diyl, each of which is unsubstituted or substituted with at least one radical selected from the group consisting of a $C_1$-$C_8$ alkyl group, a $C_1$-$C_8$ haloalkyl group, a $C_1$-$C_8$ alkoxyl group, halogen, a cyano group, and a nitro group;

$R^1$ and $R^2$ each, independently of one another, represent a $C_1$-$C_{70}$ straight alkyl group, a $C_3$-$C_{70}$ branched alkyl group, a $C_2$-$C_{70}$ straight alkenyl group, a $C_3$-$C_{70}$ branched alkenyl group, a $C_2$-$C_{70}$ straight alkynyl group, or a $C_4$-$C_{70}$ branched alkynyl group, wherein each of the $C_1$-$C_{70}$ straight alkyl group, the $C_3$-$C_{70}$ branched alkyl group, the $C_2$-$C_{70}$ straight alkenyl group, the $C_3$-$C_{70}$ branched alkenyl group, the $C_2$-$C_{70}$ straight alkynyl group, and the $C_4$-$C_{70}$ branched alkynyl group is unsubstituted or substituted with at least one halogen atom, and at least one —$CH_2$— group in each of the $C_1$-$C_{70}$ straight alkyl group, the $C_3$-$C_{70}$ branched alkyl group, the $C_2$-$C_{70}$ straight alkenyl group, the $C_3$-$C_{70}$ branched alkenyl group, the $C_2$-$C_{70}$ straight alkynyl group, and the $C_4$-$C_{70}$ branched alkynyl group is optionally replaced with a first divalent radical selected from the group consisting of —SiR$^a$$_2$—, —O—, —CO—, —COO—, and —OCO—, wherein R$^a$ represents hydrogen, a C$_1$-C$_4$ straight alkyl group, or a C$_3$-C$_4$ branched alkyl group, with the proviso that when at least two of the —CH$_2$— groups are replaced with the first divalent radicals, the first divalent radicals are not bonded to each other directly, at least one of Z$^1$ and R$^1$ contains —SiR$^a$$_2$—, and at least one of Z$^2$, Z$^3$, Z$^4$, and R$^2$ contains —SiR$^a$$_2$—;

S$^1$ to S$^4$ each, independently of one another, represent a single bond, a C$_1$-C$_{12}$ straight alkylene group, a C$_3$-C$_{12}$ branched alkylene group, a C$_2$-C$_{12}$ straight alkenylene group, or a C$_3$-C$_{12}$ branched alkenylene group, wherein at least one —CH$_2$— group in each of the C$_1$-C$_{12}$ straight alkylene group, the C$_3$-C$_{12}$ branched alkylene group, the C$_2$-C$_{12}$ straight alkenylene group, and the C$_3$-C$_{12}$ branched alkenylene group is optionally replaced with a second divalent radical selected from the group consisting of —O—, —CO—, —COO—, and —OCO—, with the proviso that when at least two of the —CH$_2$— groups are replaced with the second divalent radicals, the second divalent radicals are not bonded to each other directly;

t is an integer ranging from 1 to 2, provided that when t is 2, two A's are the same or different and two Z$^3$s are the same or different;

m is an integer ranging from 0 to 2, provided that when m is 2, two A$^3$s are the same or different and two Z$^6$s are the same or different;

v is an integer ranging from 1 to 2, provided that when v is 2, two S$^2$s are the same or different, two W$^5$s are the same or different, two X$^5$s are the same or different, and two Y$^5$s are the same or different;

w is an integer ranging from 1 to 2, provided that when w is 2, two S$^4$s are the same or different, two W$^6$s are the same or different, two X$^6$s are the same or different, and two Y$^6$s are the same or different;

each of p and r is an integer ranging from 0 to 3, and a sum of p and r is an integer ranging from 3 to 6 provided that when p is 2 or 3, a plurality of R$^3$s are the same or different, and when r is 2 or 3, a plurality of R$^4$s are the same or different; and q is an integer ranging from 0 to 4, provided that when q is an integer ranging from 2 to 4, a plurality of Z$^8$s are the same or different and a plurality of A$^6$s are the same or different.

The term "monofunctional compound" as used herein indicates a compound having one terminal acrylate group or one terminal acrylate-derived group. Similarly, the term "difunctional compound" as used herein indicates a compound having two terminal acrylate groups or two terminal acrylate-derived groups, and the term "multifunctional compound" as used herein indicates a compound having at least two terminal acrylate groups or at least two terminal acrylate-derived groups. The term "acrylate-derived group" as used herein indicates an acrylate group having at least one substituent at position 1 or position 2 thereof, and examples thereof include, but are not limited to,

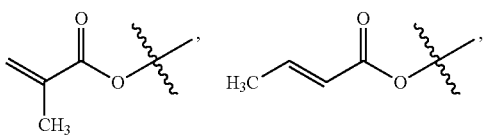

-continued

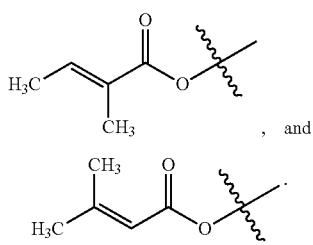

, and

The details of the term "spacer group" used herein may be found in, for example, *Pure Appl. Chem.* 73 (5), 888 (2001), C. Tschierske, G. Pelzl, S. Diele, *Angew. Chem.* 2004, 116, 6340-6368, and the like. Unless defined otherwise, examples of the spacer group, include, but are not limited to, —O—, —COO—, —OCO—, —C≡C—, —S—, —N—, a straight or branched alkylene group, a straight or branched alkenylene group, a straight or branched alkynylene group, and combinations thereof.

The term "pyridine-2,5-diyl" as used herein includes

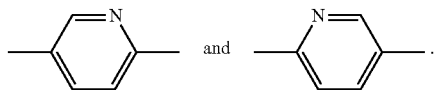

The term "pyrimidine-2,5-diyl" as used herein includes

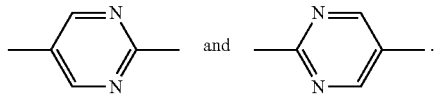

The term "tetrahydronaphthalene-2,6-diyl" as used herein includes

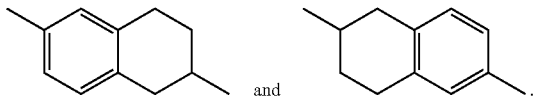

The term "benzofuran-2,5-diyl" as used herein includes

The term "1,3-dioxane-2,5-diyl" as used herein includes

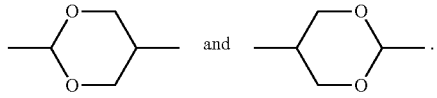

The term "tetrahydropyran-2,5-diyl" as used herein includes

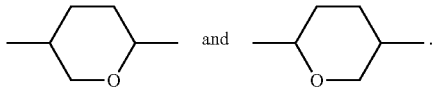

The term "divalent dioxa-bicyclo[2.2.2]octyl functional group" as used herein includes

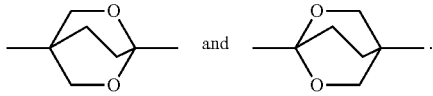

The term "divalent trioxa-bicyclo[2.2.2]octyl functional group" as used herein includes

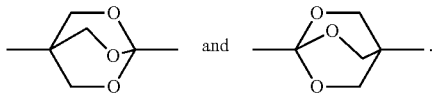

The term "indane-2,5-diyl" as used herein includes

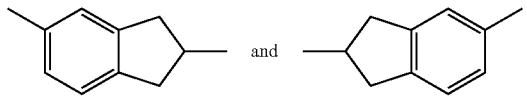

In certain embodiments, the spacer group for $Z^1$ to $Z^9$ is —C≡C—, a $C_1$-$C_{15}$ straight alkylene group, a $C_3$-$C_{15}$ branched alkylene group, a $C_2$-$C_{15}$ straight alkenylene group, or a $C_3$-$C_{15}$ branched alkenylene group, wherein each of the $C_1$-$C_{15}$ straight alkylene group, the $C_3$-$C_{15}$ branched alkylene group, the $C_2$-$C_{15}$ straight alkenylene group, and the $C_3$-$C_{15}$ branched alkenylene group is unsubstituted or substituted with at least one halogen atom, and at least one —$CH_2$— group in each of the $C_1$-$C_{15}$ straight alkylene group, the $C_3$-$C_{15}$ branched alkylene group, the $C_2$-$C_{15}$ straight alkenylene group, and the $C_3$-$C_{15}$ branched alkenylene group is optionally replaced with a third divalent radical selected from the group consisting of —$SiR^a_2$—, —S—, —O—, —CO—, —COO—, —OCO—, —CO—$NR^b$—, and —$NR^b$—CO—, wherein $R^a$ and $R^b$ each, independently of one another, represent hydrogen, a $C_1$-$C_4$ straight alkyl group, or a $C_3$-$C_4$ branched alkyl group, with the proviso that when at least two of the —$CH_2$— groups are replaced with the third divalent radicals, the third divalent radicals are not bonded to each other directly.

Monofunctional Compound:

The monofunctional compound is selected from the group consisting of the monofunctional compound represented by Formula (1) and the monofunctional compound represented by Formula (2) as defined above.

In certain embodiments, the monofunctional compound represented by Formula (1) is a monofunctional compound represented by Formula (1a),

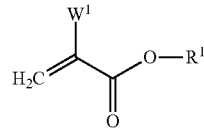

(1a)

wherein $W^1$ is as defined above for Formula (1); and $R^1$ represents a $C_1$-$C_{30}$ straight alkyl group, a $C_3$-$C_{30}$ branched alkyl group, a $C_2$-$C_{30}$ straight alkenyl group, or a $C_3$-$C_{30}$ branched alkenyl group, wherein at least one —$CH_2$— group in each of the $C_1$-$C_{30}$ straight alkyl group, the $C_3$-$C_{30}$ branched alkyl group, the $C_2$-$C_{30}$ straight alkenyl group, and the $C_3$-$C_{30}$ branched alkenyl group is replaced with a radical of —$SiR^a_2$—, wherein $R^a$ is as defined above for Formula (1).

The monofunctional compound represented by Formula (1a) used in the following illustrated examples includes monofunctional compounds represented by Formulae (1a-1), (1a-2), (1a-3), (1a-4), and (1a-5),

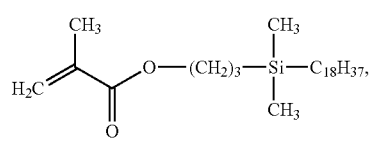

(1a-1)

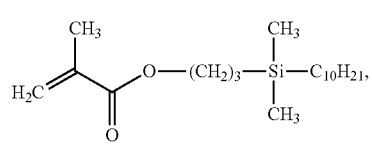

(1a-2)

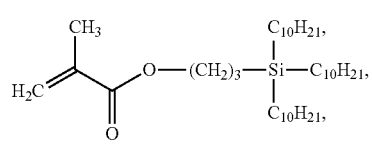

(1a-3)

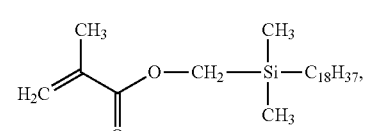

(1a-4)

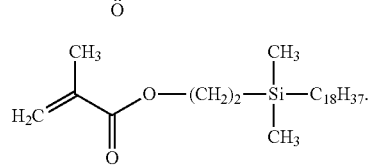

(1a-5)

In certain embodiments, the monofunctional compound represented by Formula (2) is a monofunctional compound represented by Formula (2a),

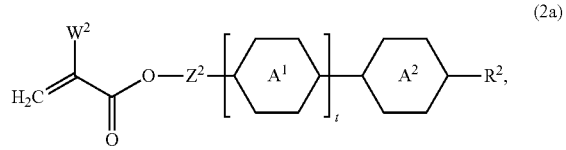

(2a)

wherein the rings $A^1$ and $A^2$ each, independently of one another, represent 1,4-phenylene, 1,4-cyclohexylene, 3-fluoro-1,4-phenylene, 3,5-difluoro-1,4-phenylene, 2,3-difluoro-1,4-phenylene, 3-methyl-1,4-phenylene, 3,5-dimethyl-1,4-phenylene, or 2,3-dimethyl-1,4-phenylene; and $W^2$, $Z^2$, t, and $R^2$ are as defined above for Formula (2).

In certain embodiments, in Formula (2a), t is 0, and the ring $A^2$ is 1,4-phenylene, i.e., the monofunctional compound represented by Formula (2a) is a monofunctional compound represented by:

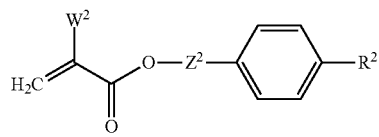

wherein $W^2$, $Z^2$, and $R^2$ are as defined above.

In certain embodiments, in Formula (2a), t is 1, the ring $A^1$ is 1,4-phenylene, and the ring $A^2$ is 1,4-cyclohexylene, i.e., the monofunctional compound represented by Formula (2a) is a monofunctional compound represented by:

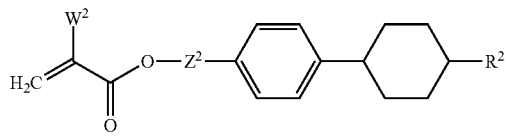

wherein $W^2$, $Z^2$, and $R^2$ are as defined above.

In certain embodiments, in Formula (2a), t is 1, the ring $A^1$ is 1,4-phenylene, and the ring $A^2$ is 1,4-phenylene, i.e., the monofunctional compound represented by Formula (2a) is a monofunctional compound represented by:

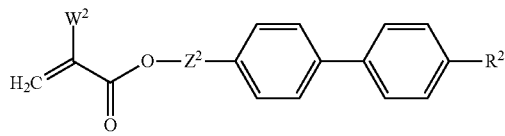

wherein $W^2$, $Z^2$, and $R^2$ are as defined above.

In certain embodiments, in Formula (2a), t is 2, one of the rings $A^1$ is 1,4-phenylene, the other of the rings $A^1$ is 1,4-cyclohexylene, and the ring $A^2$ is 1,4-cyclohexylene, i.e., the monofunctional compound represented by Formula (2a) is a monofunctional compound represented by:

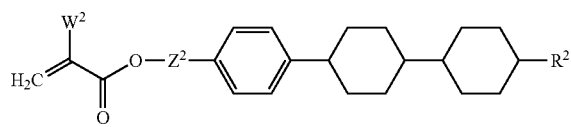

wherein $W^2$, $Z^2$, and $R^2$ are as defined above.

In certain embodiments, in Formula (2a), t is 2, both of the rings $A^1$ are 1,4-phenylene, and the ring $A^2$ is 1,4-cyclohexylene, i.e., the monofunctional compound represented by Formula (2a) is a monofunctional compound represented by:

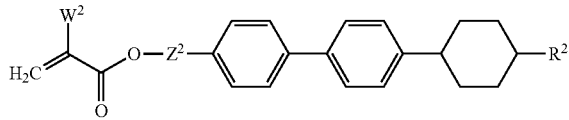

wherein $W^2$, $Z^2$, and $R^2$ are as defined above.

The monofunctional compound represented by Formula (2a) used in the following illustrated examples includes monofunctional compounds represented by Formulae (2a-1), (2a-2), (2a-3), (2a-4), (2a-5), and (2a-6),

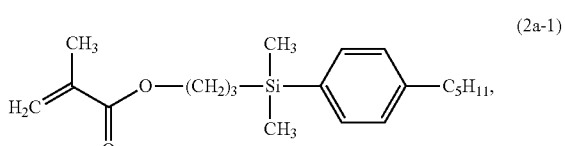

(2a-1)

(2a-2)

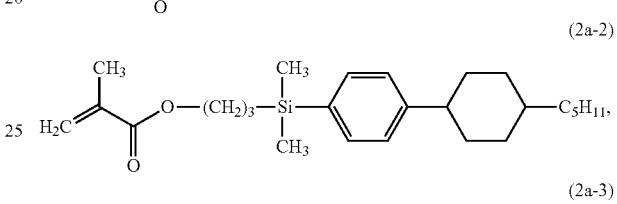

(2a-3)

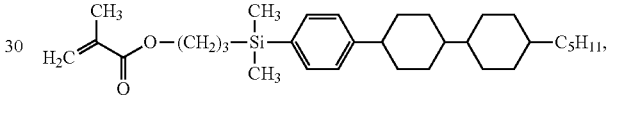

(2a-4)

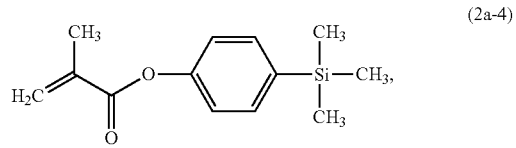

(2a-5)

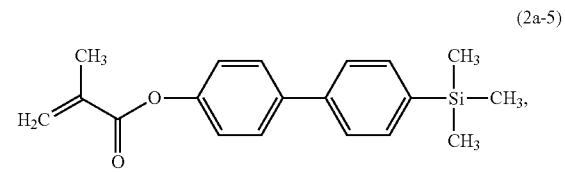

(2a-6)

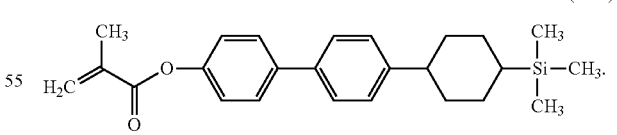

Multifunctional Compound:

The multifunctional compound is selected from the group consisting of the difunctional compound represented by Formula (3) and the multifunctional compound represented by Formula (4) as defined above.

In certain embodiments, the difunctional compound represented by Formula (3) is a difunctional compound represented by Formula (3a),

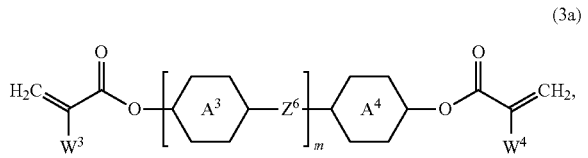

(3a)

wherein
$W^3$, $A^3$, $Z^6$, m, $A^4$, and $W^4$ are as defined above for Formula (3).

In certain embodiments, in Formula (3a), m is 1, both of the ring $A^3$ and the ring $A^4$ are 1,4-phenylene, i.e., the difunctional compound represented by Formula (3a) is a difunctional compound represented by:

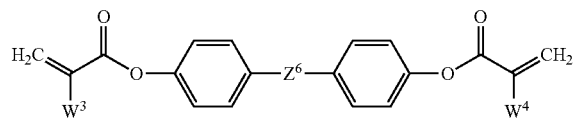

wherein $W^3$, $W^4$, and $Z^6$ are as defined above.

In certain embodiments, in Formula (3a), m is 1, the ring $A^3$ is 1,4-phenylene, and the ring $A^4$ is 3-fluoro-1,4-phenylene, i.e., the difunctional compound represented by Formula (3a) is a difunctional compound represented by:

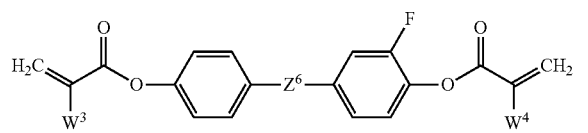

wherein $W^3$, $W^4$, and $Z^6$ are as defined above.

In certain embodiments, in Formula (3a), m is 1, the ring $A^3$ is 1,4-phenylene, the ring $A^4$ is indane-2,5-diyl, and $Z^6$ is a single bond, i.e., the difunctional compound represented by Formula (3a) is a difunctional compound represented by:

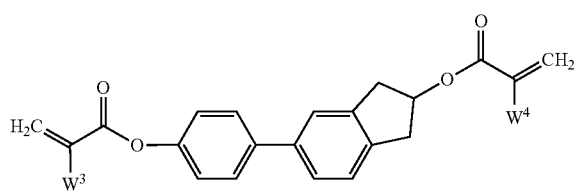

wherein $W^3$ and $W^4$ are as defined above.

In certain embodiments, in Formula (3a), m is 2, one of the rings $A^3$ is 1,4-phenylene, the other of the rings $A^3$ is 3-fluoro-1,4-phenylene, the ring $A^4$ is indane-2,5-diyl, and $Z^6$ is a single bond, i.e., the difunctional compound represented by Formula (3a) is a difunctional compound represented by:

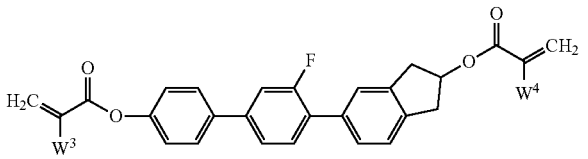

wherein $W^3$ and $W^4$ are as defined above.

The difunctional compound represented by Formula (3a) used in the following illustrated examples includes difunctional compounds represented by Formulae (3a-1), (3a-2), (3a-3), (3a-4), (3a-5), (3a-6), and (3a-7), (3a-1)

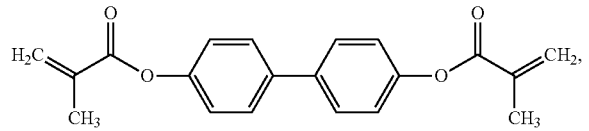

(3a-2)

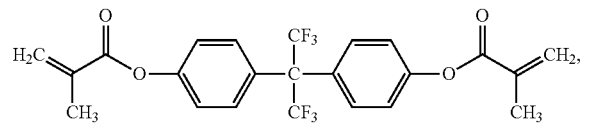

(3a-3)

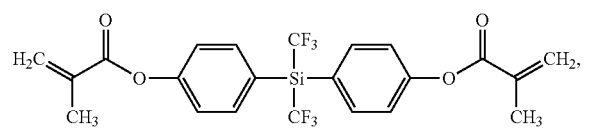

(3a-4)

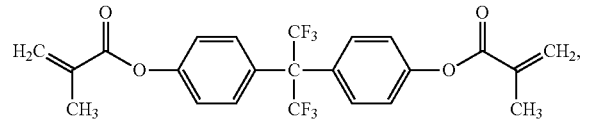

(3a-5)

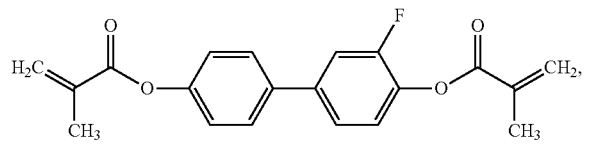

(3a-6)

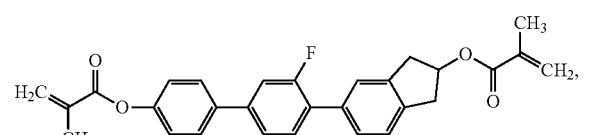

(3a-7)

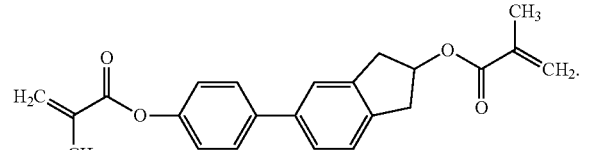

In certain embodiments, the multifunctional compound represented by Formula (4) is a multifunctional compound represented by Formula (4a),

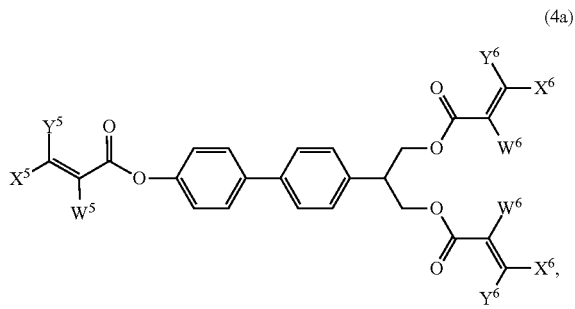

(4a)

wherein $X^5$, $X^6$, $Y^5$, $Y^6$, $W^5$ and $W^6$ are as defined above for Formula (4).

The multifunctional compound represented by Formula (4a) used in the following illustrated examples is a multifunctional compound represented by Formula (4a-1)

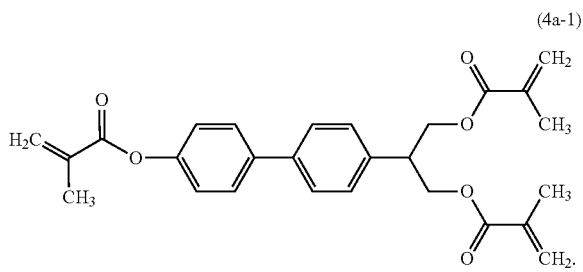 [SMILES: C=C(C)C(=O)OCC(COC(=O)C(=C)C)c1ccc(-c2ccc(OC(=O)C(=C)C)cc2)cc1]

(4a-1)

Liquid Crystal Composition:

In the liquid crystal composition according to the disclosure, an amount of the at least one monofunctional compound and that of the at least one multifunctional compound can be adjusted depending on specific requirements of the liquid crystal displays and/or properties of other liquid crystal compounds optionally used in the liquid crystal composition.

In certain embodiments, the at least one monofunctional compound is in an amount ranging from 0.1 part by weight to 20 parts by weight based on 100 parts by weight of the liquid crystal composition. In certain embodiments, the at least one monofunctional compound is in an amount ranging from 1 part by weight to 15 parts by weight based on 100 parts by weight of the liquid crystal composition. In certain embodiments, the at least one monofunctional compound is in an amount ranging from 2 parts by weight to 10 parts by weight based on 100 parts by weight of the liquid crystal composition.

In certain embodiments, the at least one multifunctional compound is in an amount ranging from 0.01 part by weight to 5 parts by weight based on 100 parts by weight of the liquid crystal composition. In certain embodiments, the at least one multifunctional compound is in an amount ranging from 0.01 part by weight to 3 parts by weight based on 100 parts by weight of the liquid crystal composition. In certain embodiments, the at least one multifunctional compound is in an amount ranging from 0.1 part by weight to 3 parts by weight based on 100 parts by weight of the liquid crystal composition.

In addition to the at least one monofunctional compound and the at least one multifunctional compound, the liquid crystal composition according to the disclosure may include other liquid crystal compound(s) having other characteristics.

In certain embodiments, the liquid crystal composition according to the disclosure further includes at least one liquid crystal compound represented by Formula (5),

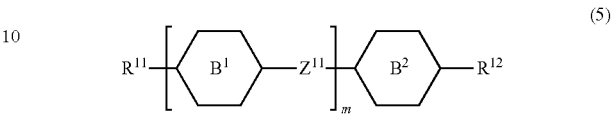

(5)

wherein $R^{11}$ and $R^{12}$ each, independently of one another, represent hydrogen, halogen, a $C_1$-$C_{15}$ straight alkyl group, a $C_3$-$C_{15}$ branched alkyl group, a $C_2$-$C_{15}$ straight alkenyl group, or a $C_3$-$C_{15}$ branched alkenyl group, wherein each of the $C_1$-$C_{15}$ straight alkyl group, the $C_3$-$C_{15}$ branched alkyl group, the $C_2$-$C_{15}$ straight alkenyl group, and the $C_3$-$C_{15}$ branched alkenyl group is unsubstituted or substituted with at least one halogen atom, and at least one —$CH_2$— group in each of the $C_1$-$C_{15}$s straight alkyl group, the $C_3$-$C_{15}$ branched alkyl group, the $C_2$-$C_{15}$ straight alkenyl group, and the $C_3$-$C_{15}$s branched alkenyl group is optionally replaced with a —O— radical, with the proviso that when at least two of the —$CH_2$— groups are replaced with the —O— radicals, the —O— radicals are not bonded to each other directly;

$B^1$ and $B^2$ each, independently of one another, represent 1,4-phenylene, 1,4-cyclohexylene, benzofuran-2,5-diyl, 1,3-dioxane-2,5-diyl, tetrahydropyran-2,5-diyl, a divalent dioxa-bicyclo[2.2.2]octyl functional group, a divalent tri-oxa-bicyclo[2.2.2]octyl functional group, or indane-2,5-diyl, wherein each of the 1,4-phenylene, the 1,4-cyclohexylene, the benzofuran-2,5-diyl, the 1,3-dioxane-2,5-diyl, and the tetrahydropyran-2,5-diyl is unsubstituted or substituted with at least one radical selected from the group consisting of halogen and a cyano group, and at least one —$CH_2$— group in each of the 1,4-phenylene, the 1,4-cyclohexylene, the benzofuran-2,5-diyl, the 1,3-dioxane-2,5-diyl, and the tetrahydropyran-2,5-diyl is optionally replaced with a fourth divalent radical selected from the group consisting of —O—, —N—, and —S—, with the proviso that when at least two of the —$CH_2$— groups are replaced with the fourth divalent radicals, the fourth divalent radicals are not bonded to each other directly;

$Z^{11}$ represents a single bond, a $C_1$-$C_4$ straight alkylene group, a $C_3$-$C_4$ branched alkylene group, a $C_2$-$C_4$ straight alkenylene group, a $C_3$-$C_4$ branched alkenylene group, a $C_2$-$C_4$ straight alkynylene group, or a $C_4$ branched alkynylene group, wherein each of the $C_1$-$C_4$ straight alkylene group, the $C_3$-$C_4$ branched alkylene group, the $C_2$-$C_4$ straight alkenylene group, the $C_3$-$C_4$ branched alkenylene group, the $C_2$-$C_4$ straight alkynylene group, and the $C_4$ branched alkynylene group is unsubstituted or substituted with at least one radical selected from the group consisting of halogen and a cyano group, and at least one —$CH_2$— group in each of the $C_1$-$C_4$ straight alkylene group, the $C_3$-$C_4$ branched alkylene group, the $C_2$-$C_4$ straight alkenylene group, the $C_3$-$C_4$ branched alkenylene group, the $C_2$-$C_4$ straight alkynylene group, and the $C_4$ branched alkynylene group is optionally replaced with a fifth divalent radical selected from the group consisting of —O— and —S—, with the proviso that when at least two of the —CH$_2$— groups are replaced with the fifth divalent radicals, the fifth divalent radicals are not bonded to each other directly; and n1 is an integer ranging from 0 to 2, provided that when n1 is 2, two B's are the same or different and two Z$^{11}$'s are the same or different.

In certain embodiments, the liquid crystal compound represented by Formula (5) is selected from the group consisting of a liquid crystal compound represented by Formula (5a) and a liquid crystal compound represented by Formula (5b),

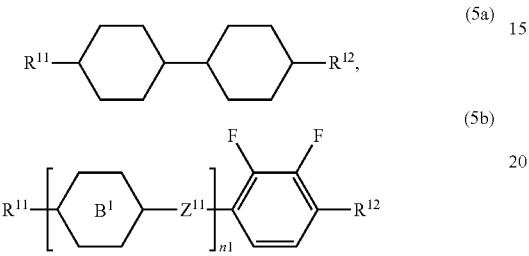

(5a)

(5b)

wherein

R$^{11}$ and R$^{12}$ are as defined above for Formula (5);

B$^1$ represents 1,4-phenylene or 1,4-cyclohexylene, wherein each of the 1,4-phenylene and the 1,4-cyclohexylene is unsubstituted or substituted with at least one radical selected from the group consisting of halogen and a cyano group, and at least one —CH$_2$— group in each of the 1,4-phenylene and the 1,4-cyclohexylene is optionally replaced with the fourth divalent radical selected from the group consisting of —O—, —N—, and —S—, with the proviso that when at least two of the —CH$_2$— groups are replaced with the fourth divalent radicals, the fourth divalent radicals are not bonded to each other directly; and n1 is 1 or 2.

The liquid crystal compound represented by Formula (5a) used in the following illustrated examples includes liquid crystal compounds represented by Formulae (5a-1), (5a-2), (5a-3), and (5a-4),

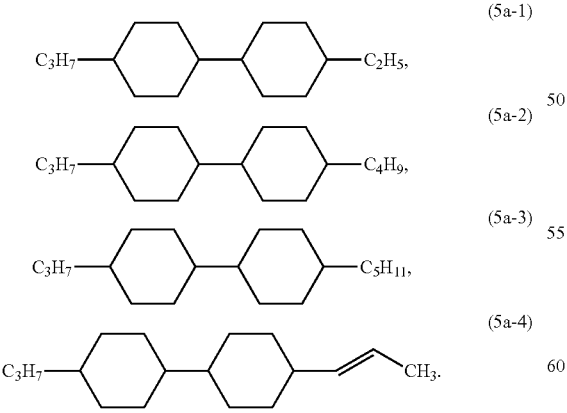

In certain embodiments, in Formula (5b), n1 is 1 and B$^1$ represents 1,4-cyclohexylene, i.e., the liquid crystal compound represented by Formula (5b) is a liquid crystal compound represented by:

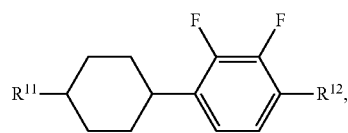

wherein R$^{11}$ and R$^{12}$ are as defined above.

In certain embodiments, in Formula (5b), n1 is 1 and B$^1$ represents 1,4-phenylene, i.e., the liquid crystal compound represented by Formula (5b) is a liquid crystal compound represented by:

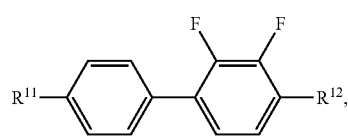

wherein R$^{11}$ and R$^{12}$ are as defined above.

In certain embodiments, in Formula (5b), n1 is 2 and the two B's represent 1,4-cyclohexylene and 1,4-phenylene, respectively, i.e., the liquid crystal compound represented by Formula (5b) is a liquid crystal compound represented by:

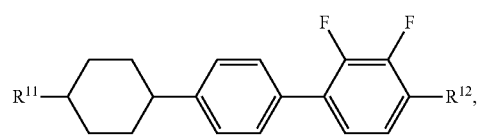

wherein R$^{11}$ and R$^{12}$ are as defined above.

In certain embodiments, in Formula (5b), n1 is 2 and both B's represent 1,4-cyclohexylene, i.e., the liquid crystal compound represented by Formula (5b) is a liquid crystal compound represented by:

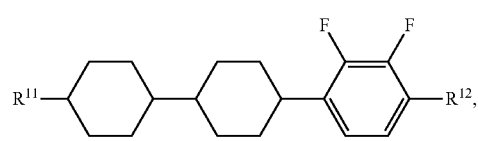

wherein R$^{11}$ and R$^{12}$ are as defined above.

The liquid crystal compound represented by Formula (5b) used in the following illustrated examples includes liquid crystal compounds represented by Formulae (5b-1), (5b-2), (5b-3), and (5b-4),

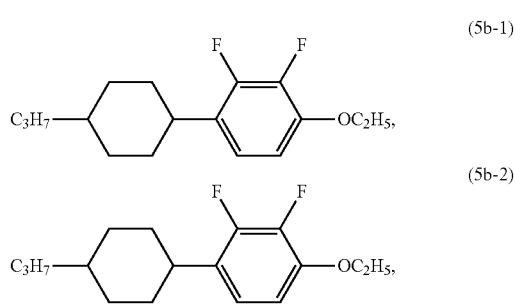

(5b-1)

(5b-2)

-continued

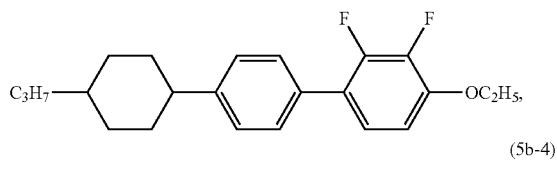

(5b-3)

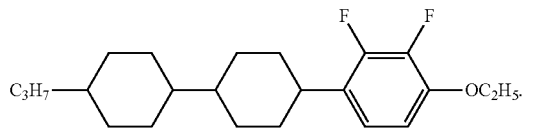

(5b-4)

In certain embodiments, the compound represented by Formula (5) is in an amount ranging from 20 parts by weight to 99 parts by weight based on 100 parts by weight of the liquid crystal composition. In certain embodiments, the compound represented by Formula (5) is in an amount ranging from 50 parts by weight to 99 parts by weight based on 100 parts by weight of the liquid crystal composition.

In addition, the liquid crystal composition according to the disclosure may optionally include any liquid crystal compound having various properties.

Application:

The liquid crystal composition according to the disclosure can be used to make a liquid crystal layer of a liquid crystal display, especially a liquid crystal display without an alignment film.

Examples of the disclosure will be described hereinafter. It is to be understood that these examples are exemplary and explanatory and should not be construed as a limitation to the disclosure.

Synthesis Example 1: Preparation of a Monofunctional Compound of Formula (1a-1)

The monofunctional compound of Formula (1a-1) was synthesized according to the reaction scheme below.

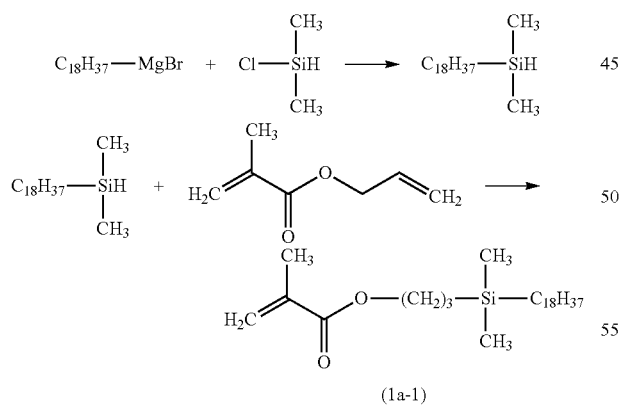

(1a-1)

Dimethylchlorosilane (0.1 mol) and tetrahydrofuran (THF, 100 ml) were added into a reaction flask. Then, octadecyl magnesium bromide (0.1 mol) was slowly added into the reaction flask at −20° C. under a nitrogen atmosphere, followed by stirring at −20° C. for 2 hours and further at room temperature for 10 hours. Subsequently, a saline solution (10 ml) was added into the reaction flask to obtain a reaction mixture. The reaction mixture was extracted with ethyl acetate and a saline solution, followed by collecting an organic layer. The organic layer was concentrated and purified via column chromatography using hexane as an eluent to obtain octadecyldimethylsilane as a liquid.

Octadecyldimethylsilane (0.1 mol), toluene (200 ml), a platinum/carbon (Pt/C) catalyst (0.5 g, content of Pt: 5 wt %, allyl methacrylate (0.1 mol) were added into a reaction flask under a nitrogen atmosphere, followed by stirring at 80° C. for 5 hours to obtain a reaction mixture. The reaction mixture was extracted with a saline solution and toluene, followed by collecting an organic layer. The organic layer was concentrated and purified via column chromatography using a mixture of ethyl acetate and hexane in a volume ratio of 1:9 as an eluent, thereby obtaining the monofunctional compound of Formula (1a-1) as a colorless oil.

The molecular weight of the monofunctional compound of Formula (1a-1) was determined using a gas chromatography-mass spectrometer (GC-MS) and is shown to be m/z=423 [M]+.

Synthesis Example 2: Preparation of a Monofunctional Compound of Formula (1a-2)

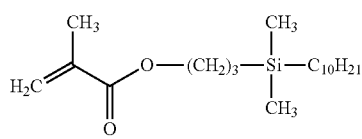

The procedures of Synthesis Example 1 were repeated except that octadecyl magnesium bromide used in Synthesis Example 1 was replaced with decyl magnesium bromide (0.1 mol), thereby obtaining the monofunctional compound of Formula (1a-2) as a colorless oil.

The molecular weight of the monofunctional compound of Formula (1a-2) was determined using GC-MS and is shown to be m/z=311[M].

Synthesis Example 3: Preparation of a Monofunctional Compound of Formula (2a-1)

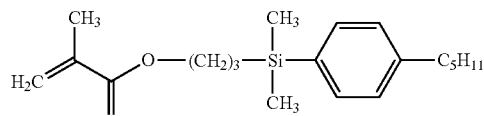

The procedures of Synthesis Example 1 were repeated except that octadecyl magnesium bromide used in Synthesis Example 1 was replaced with 4-pentylphenyl magnesium bromide (0.1 mol), thereby obtaining the monofunctional compound of Formula (2a-1) as a colorless oil.

The molecular weight of the monofunctional compound of Formula (2a-1) was determined using GC-MS and is shown to be m/z=317[M].

Synthesis Example 4: Preparation of a Monofunctional Compound of Formula (2a-2)

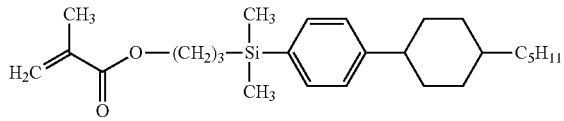

The procedures of Synthesis Example 1 were repeated except that octadecyl magnesium bromide used in Synthesis Example 1 was replaced with 4-(trans-4-pentylcyclohexyl) phenyl magnesium bromide (0.1 mol), thereby obtaining the monofunctional compound of Formula (2a-2) as a colorless oil.

The molecular weight of the monofunctional compound of Formula (2a-2) was determined using GC-MS and is shown to be m/z=399 [M].

Synthesis Example 5: Preparation of a Monofunctional Compound of Formula (2a-3)

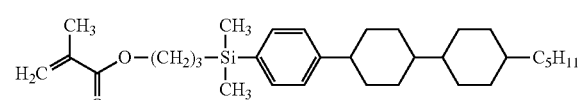

The procedures of Synthesis Example 1 were repeated except that octadecyl magnesium bromide used in Synthesis Example 1 was replaced with 4-(trans-4-pentylcyclohexyl) cyclohexylphenyl magnesium bromide (0.1 mol), thereby obtaining the monofunctional compound of Formula (2a-3) as a colorless oil.

The molecular weight of the monofunctional compound of Formula (2a-3) was determined using GC-MS and is shown to be m/z=481[M].

Examples 1 to 12 and Comparative Example 1: Preparation of Liquid Crystal Compositions Each of the liquid crystal compositions of Examples 1 to 12 and Comparative Example 1 was prepared by homogeneously mixing the compounds and the amounts thereof shown in Table 1 to a premix, followed by heating the premix to a clearing point ($T_{ni}$) and then cooling to room temperature.

TABLE 1

| | | Examples | | | | | | | | | | | | Comp. |
|---|---|---|---|---|---|---|---|---|---|---|---|---|---|---|
| | | 1 | 2 | 3 | 4 | 5 | 6 | 7 | 8 | 9 | 10 | 11 | 12 | Ex. 1 |
| Mono- | 1a-1 | 2.90 | | | | | | | | | | 7.35 | | |
| functional | 1a-2 | | 0.98 | | | | | | | 1.95 | 6.53 | | 0.94 | |
| compounds | 2a-1 | | | 2.91 | | 7.34 | | | | | | | | |
| | 2a-2 | | | | 8.85 | | 2.90 | | | | | | 4.69 | |
| | 2a-3 | | | | | | | 2.90 | 3.64 | | | | | |
| Multi- | 3a-1 | 0.29 | | 0.19 | 0.64 | | 0.19 | | 0.29 | | | 0.28 | | 0.3 |
| functional | 3a-2 | | | | | | | 0.19 | 0.19 | | | 0.46 | | |
| compounds | 3a-3 | | | | 1.97 | | | | | | | | | |
| | 3a-4 | | | | | | 0.19 | | | | | | | |
| | 3a-6 | | | | | 0.92 | | 0.29 | | | 0.19 | | | |
| | 3a-7 | | 0.59 | | | | | | | 0.58 | | | 0.56 | |
| | 5a-1 | 9.68 | 9.84 | 9.69 | 8.85 | 9.17 | 9.67 | 9.66 | 9.59 | 9.75 | 9.33 | 9.19 | 9.38 | 9.97 |
| | 5a-2 | 4.84 | 4.92 | 4.84 | 4.43 | 4.59 | 4.84 | 4.83 | 4.79 | 4.87 | 4.66 | 4.60 | 4.69 | 4.99 |
| | 5a-3 | 11.62 | 11.81 | 11.63 | 10.63 | 11.01 | 11.61 | 11.59 | 11.51 | 11.70 | 11.19 | 11.03 | 11.26 | 11.96 |
| | 5a-4 | 13.55 | 13.78 | 13.57 | 12.40 | 12.84 | 13.54 | 13.53 | 13.42 | 13.65 | 13.06 | 12.87 | 13.13 | 13.96 |
| | 5b-1 | 9.68 | 9.84 | 9.69 | 8.85 | 9.17 | 9.67 | 9.66 | 9.59 | 9.75 | 9.33 | 9.19 | 9.38 | 9.97 |
| | 5b-2 | 18.39 | 18.70 | 18.41 | 16.82 | 17.43 | 18.38 | 18.36 | 18.22 | 18.52 | 17.72 | 17.46 | 17.82 | 18.94 |
| | 5b-3 | 14.52 | 14.76 | 14.53 | 13.28 | 13.76 | 14.51 | 14.49 | 14.38 | 14.62 | 13.99 | 13.79 | 14.07 | 14.96 |
| | 5b-4 | 14.52 | 14.76 | 14.53 | 13.28 | 13.76 | 14.51 | 14.49 | 14.38 | 14.62 | 13.99 | 13.79 | 14.07 | 14.96 |

Application Examples 1 to 12 and Comparative Application Example 1: Preparation of Liquid Crystal Displays Each of the liquid crystal compositions of Examples 1 to 12 and Comparative Example 1 was injected into a space between two indium tin oxide-coated substrates (ITO-coated substrates) with a cell gap of 3.5 μm, followed by sealing according to a common method for preparing a liquid crystal cell. A DC voltage of 12 V was applied to the liquid crystal cell thus prepared while irradiating with ultraviolet light (peak wavelength: 313 nm) for curing to obtain a liquid crystal display.

Measurements:

Each of the liquid crystal displays of Application Examples 1 to 12 and Comparative Application Example 1 was measured for vertical alignment thereof according to the method below. Furthermore, each of the liquid crystal displays of Application Examples 1, 2, 6, 7, 11, and 12, and Comparative Application Example 1 was measured for voltage holding ratio and pretilt angle thereof according to the methods below. The results are shown in Tables 2 and 3 below.

1. Vertical Alignment:

The liquid crystal display was disposed on a polarizing microscope equipped with a polarizer and an analyzer which were arranged orthogonally to one another. The liquid crystal display was irradiated using a light source disposed below the polarizing microscope, and the presence or absence of light leakage was observed to determine the vertical alignment of the liquid crystal display. Evaluation was made according to the standards below.

○: light leakage was not observed on the whole liquid crystal display

Δ: light leakage was observed on part(s) of the liquid crystal display x: light leakage was observed on the whole liquid crystal display 2. Voltage Holding Ratio:

A DC voltage (charge voltage: 5V, operating frequency: 0.6 Hz, and pulse width: 60 μsec) was applied to the liquid crystal display at an environmental temperature of 60° C. to measure the voltage holding ratio thereof. A minimum current and an extremely low leakage voltage of the liquid crystal display were measured using a liquid crystal measuring instrument (Model: ALCT-IV1, Manufacturer: INSTEC Corporation) to determine the voltage holding ratio at a voltage of 5V.

3. Pretilt Angle:

The pretilt angle of liquid crystal molecules in a liquid crystal cell was measured via a crystal rotation method. Specifically, the liquid crystal cell was rotated to change an incident angle of a laser light. The change in phase retardation of the laser light transmitted through the liquid crystal cell was used to determine the pretilt angle of the liquid crystal molecules.

TABLE 2

| Measure-ment | Application Examples | | | | | | | | | | | | Comparative Application Example 1 |
|---|---|---|---|---|---|---|---|---|---|---|---|---|---|
| | 1 | 2 | 3 | 4 | 5 | 6 | 7 | 8 | 9 | 10 | 11 | 12 | |
| Vertical alignment | ○ | Δ | Δ | ○ | Δ | ○ | Δ | Δ | ○ | ○ | ○ | ○ | x |

As shown in Table 2, all of the liquid crystal displays of Application Examples 1 to 12 have satisfactory vertical alignment, demonstrating that the liquid crystal composition according to the disclosure, which includes the specific monofunctional compound and the specific multifunctional compound, exhibits satisfactory vertical alignment. Contrarily, the liquid crystal displays of Comparative Application Example 1, in which the liquid crystal composition only includes a difunctional compound, have inferior vertical alignment.

TABLE 3

| Measure-ments | Application Examples | | | | | | Comparative Application Example 1 |
|---|---|---|---|---|---|---|---|
| | 1 | 2 | 6 | 7 | 11 | 12 | |
| Pretilt angle (°) | 90.13 | — | 90.069 | — | 89.68 | 89.78 | — |
| Voltage holding ratio (%) | 98.04 | 91.89 | 88.99 | 94.51 | 89.54 | 84.51 | 69.29 |

As shown in Table 3, each of the liquid crystal displays of Application Examples 1, 2, 6, 7, 11, and 12 has a voltage holding ratio that is significantly higher than that of the liquid crystal display of Comparative Application Example 1, demonstrating that the liquid crystal composition according to the disclosure can be used for preparing a liquid crystal display having a superior voltage holding ratio. In addition, each of the liquid crystal displays of Application Examples 1, 6, 11, and 12 has a satisfactory pretilt angle to satisfy subsequent requirements.

In view of the aforesaid, the liquid crystal composition according to the disclosure, which includes the specific monofunctional compound and the specific multifunctional compound, exhibits satisfactory vertical alignment. In addition, the liquid crystal display prepared using the liquid crystal composition according to the disclosure exhibits a superior voltage holding ratio.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A liquid crystal composition, comprising:
   at least one monofunctional compound selected from the group consisting of a monofunctional compound represented by Formula (1) and a monofunctional compound represented by Formula (2), and
   at least one multifunctional compound selected from the group consisting of a difunctional compound represented by Formula (3) and a multifunctional compound represented by Formula (4),

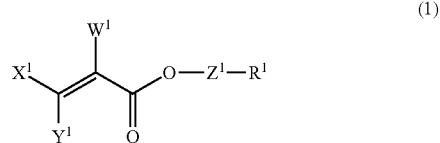

(1)

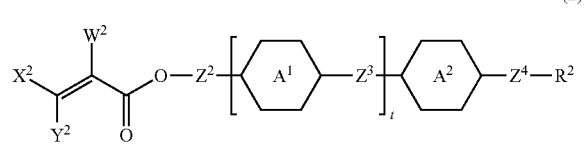

(2)

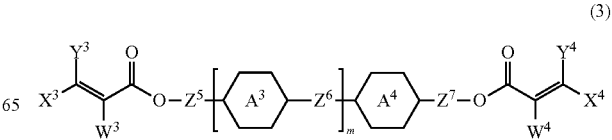

(3)

-continued

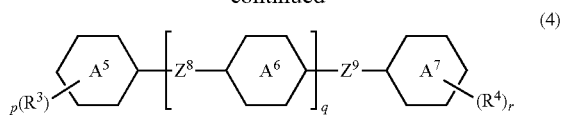
(4)

wherein
R³ represents a radical of

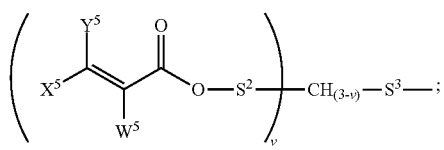

R⁴ represents a radical of

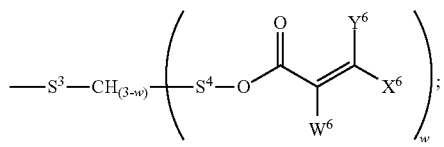

X¹ to X⁶, Y¹ to Y⁶, and W¹ to W⁶ are each, independently of one another, selected from the group consisting of hydrogen, hydroxyl, halogen, a $C_1$-$C_{15}$ straight alkyl group, a $C_3$-$C_{15}$ branched alkyl group, a $C_2$-$C_{15}$ straight alkenyl group, a $C_3$-$C_{15}$ branched alkenyl group, a $C_2$-$C_{15}$ straight alkynyl group, and a $C_4$-$C_{15}$ branched alkynyl group, wherein each of said $C_1$-$C_{15}$ straight alkyl group, said $C_3$-$C_{15}$ branched alkyl group, said $C_2$-$C_{15}$ straight alkenyl group, said $C_3$-$C_{15}$ branched alkenyl group, said $C_2$-$C_{15}$ straight alkynyl group, and said $C_4$-$C_{15}$ branched alkynyl group is unsubstituted or substituted with at least one radical selected from the group consisting of halogen and hydroxyl, and at least one —CH₂— group in each of said $C_1$-$C_{15}$ straight alkyl group, said $C_3$-$C_{15}$ branched alkyl group, said $C_2$-$C_{15}$ straight alkenyl group, said $C_3$-$C_{15}$ branched alkenyl group, said $C_2$-$C_{15}$ straight alkynyl group, and said $C_4$-$C_{15}$ branched alkynyl group is optionally replaced with a ring radical;

Z¹ to Z⁹ are each, independently of one another, selected from the group consisting of a single bond and a spacer group;

rings A¹ to A⁷ are each, independently of one another, selected from the group consisting of 1,4-phenylene, 1,4-cyclohexylene, 1,4-cyclohexenylene, pyridine-2,5-diyl, pyrimidine-2,5-diyl, naphthalene-2,6-diyl, naphthalene-1,4-diyl, tetrahydronaphthalene-2,6-diyl, 1,3-dioxane-2,5-diyl, benzofuran-2,5-diyl, tetrahydropyran-2,5-diyl, a divalent dioxa-bicyclo[2.2.2]octyl functional group, a divalent trioxa-bicyclo[2.2.2]octyl functional group, and indane-2,5-diyl, each of which is unsubstituted or substituted with at least one radical selected from the group consisting of a $C_1$-$C_8$ alkyl group, a $C_1$-$C_8$ haloalkyl group, a $C_1$-$C_8$ alkoxyl group, halogen, a cyano group, and a nitro group;

R¹ and R² are each, independently of one another, selected from the group consisting of a $C_1$-$C_{70}$ straight alkyl group, a $C_3$-$C_{70}$ branched alkyl group, a $C_2$-$C_{70}$ straight alkenyl group, a $C_3$-$C_{70}$ branched alkenyl group, a $C_2$-$C_{70}$ straight alkynyl group, and a $C_4$-$C_{70}$ branched alkynyl group, wherein each of said $C_1$-$C_{70}$ straight alkyl group, said $C_3$-$C_{70}$ branched alkyl group, said $C_2$-$C_{70}$ straight alkenyl group, said $C_3$-$C_{70}$ branched alkenyl group, said $C_2$-$C_{70}$ straight alkynyl group, and said $C_4$-$C_{70}$ branched alkynyl group is unsubstituted or substituted with at least one halogen atom, and at least one —CH₂—group in each of said $C_1$-$C_{70}$ straight alkyl group, said $C_3$-$C_{70}$ branched alkyl group, said $C_2$-$C_{70}$ straight alkenyl group, said $C_3$-$C_{70}$ branched alkenyl group, said $C_2$-$C_{70}$ straight alkynyl group, and said $C_4$-$C_{70}$ branched alkynyl group is optionally replaced with a first divalent radical selected from the group consisting of —SiR$^a_2$—, —O—, —CO—, —COO—, and —OCO—, wherein R$^a$ is selected from the group consisting of hydrogen, a $C_1$-$C_4$ straight alkyl group, and a $C_3$-$C_4$ branched alkyl group, with the proviso that when at least two of said —CH₂— groups are replaced with said first divalent radicals, said first divalent radicals are not bonded to each other directly, at least one of Z¹ and R¹ contains —SiR$^a_2$—, and
at least one of Z², Z³, Z⁴, and R² contains —SiR$^a_2$—;

S¹ to S⁴ are each, independently of one another, selected from the group consisting of a single bond, a $C_1$-$C_{12}$ straight alkylene group, a $C_3$-$C_{12}$ branched alkylene group, a $C_2$-$C_{12}$ straight alkenylene group, and a $C_3$-$C_{12}$ branched alkenylene group, wherein at least one —CH₂— group in each of said $C_1$-$C_{12}$ straight alkylene group, said $C_3$-$C_{12}$ branched alkylene group, said $C_2$-$C_{12}$ straight alkenylene group, and said $C_3$-$C_{12}$ branched alkenylene group is optionally replaced with a second divalent radical selected from the group consisting of —O—, —CO—, —COO—, and —OCO—, with the proviso that when at least two of said —CH₂—groups are replaced with said second divalent radicals, said second divalent radicals are not bonded to each other directly;

t is an integer ranging from 1 to 2, provided that when t is 2, two A¹s are the same or different and two Z³s are the same or different;

m is an integer ranging from 0 to 2, provided that when m is 2, two A³s are the same or different and two Z⁶s are the same or different;

v is an integer ranging from 1 to 2, provided that when v is 2, two S²s are the same or different, two W⁵s are the same or different, two X⁵s are the same or different, and two Y⁵s are the same or different;

w is an integer ranging from 1 to 2, provided that when w is 2, two S⁴s are the same or different, two W⁶s are the same or different, two X⁶s are the same or different, and two Y⁶s are the same or different;

each of p and r is an integer ranging from 0 to 3, and a sum of p and r is an integer ranging from 3 to 6 provided that when p is 2 or 3, a plurality of R³s are the same or different, and when r is 2 or 3, a plurality of R⁴s are the same or different; and q is an integer ranging from 0 to 4, provided that when q is an integer ranging from 2 to 4, a plurality of Z⁸s are the same or different and a plurality of A⁶s are the same or different.

2. The liquid crystal composition according to claim 1, wherein said spacer group is selected from the group consisting of —C≡C—, a $C_1$-$C_{15}$ straight alkylene group, a $C_3$-$C_{15}$ branched alkylene group, a $C_2$-$C_{15}$ straight alkenylene group, and a $C_3$-$C_{15}$ branched alkenylene group, wherein each of said $C_1$-$C_{15}$ straight alkylene group, said $C_3$-$C_{15}$ branched alkylene group, said $C_2$-$C_{15}$ straight alkenylene group, and said $C_3$-$C_{15}$ branched alkenylene group is unsubstituted or substituted with at least one halogen atom, and at least one —$CH_2$—group in each of said $C_1$-$C_{15}$ straight alkylene group, said $C_3$-$C_{15}$ branched alkylene group, said $C_2$-$C_{15}$ straight alkenylene group, and said $C_3$-$C_{15}$ branched alkenylene group is optionally replaced with a third divalent radical selected from the group consisting of —$SiR^a_2$—, —S—, —O—, —CO—, —COO—, —OCO—, —CO—$NR^b$—, and —$NR^b$—CO—, wherein $R^a$ and $R^b$ are each, independently of one another, selected from the group consisting of hydrogen, a $C_1$-$C_4$ straight alkyl group, and a $C_3$-$C_4$ branched alkyl group, with the proviso that when at least two of said —$CH_2$— groups are replaced with said third divalent radicals, said third divalent radicals are not bonded to each other directly.

3. The liquid crystal composition according to claim 1, wherein said monofunctional compound represented by Formula (1) is a monofunctional compound represented by Formula (1a),

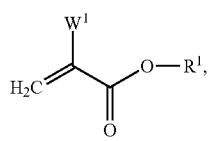

(1a)

wherein $W^1$ is as defined in claim 1; and $R^1$ is selected from the group consisting of a $C_1$-$C_{30}$ straight alkyl group, a $C_3$-$C_{30}$ branched alkyl group, a $C_2$-$C_{30}$ straight alkenyl group, and a $C_3$-$C_{30}$ branched alkenyl group, wherein at least one —$CH_2$— group in each of said $C_1$-$C_{30}$ straight alkyl group, said $C_3$-$C_{30}$ branched alkyl group, said $C_2$-$C_{30}$ straight alkenyl group, and said $C_3$-$C_{30}$ branched alkenyl group is replaced with a radical of —$SiR^a_2$—, wherein $R^a$ is as defined in claim 1.

4. The liquid crystal composition according to claim 1, wherein said monofunctional compound represented by Formula (2) is a monofunctional compound represented by Formula (2a),

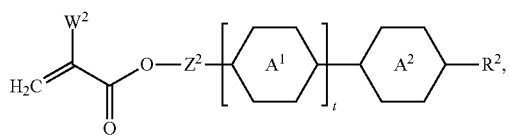

(2a)

wherein said rings $A^1$ and $A^2$ are each, independently of one another, selected from the group consisting of 1,4-phenylene, 1,4-cyclohexylene, 3-fluoro-1,4-phenylene, 3,5-difluoro-1,4-phenylene, 2,3-difluoro-1,4-phenylene, 3-methyl-1,4-phenylene, 3,5-dimethyl-1,4-phenylene, and 2,3-dimethyl-1,4-phenylene; and $W^2$, $Z^2$, and $R^2$ are as defined in claim 1.

5. The liquid crystal composition according to claim 1, wherein said difunctional compound represented by Formula (3) is a difunctional compound represented by Formula (3a),

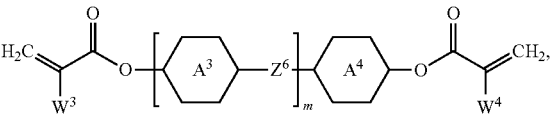

(3a)

wherein $W^3$, $A^3$, $Z^6$, m, $A^4$, and $W^4$ are as defined in claim 1.

6. The liquid crystal composition according to claim 1, wherein said multifunctional compound represented by Formula (4) is a multifunctional compound represented by Formula (4a),

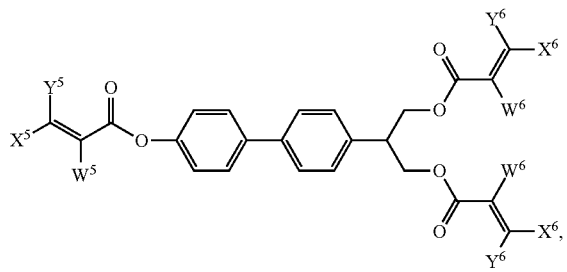

(4a)

wherein $X^5$, $Y^5$, $W^5$, $X^6$, $Y^6$ and $W^6$ are as defined in claim 1.

7. The liquid crystal composition according to claim 1, wherein said at least one monofunctional compound is in an amount ranging from 0.1 part by weight to 20 parts by weight and said at least one multifunctional compound is in an amount ranging from 0.01 part by weight to 5 parts by weight based on 100 parts by weight of said liquid crystal composition.

8. The liquid crystal composition according to claim 1, further comprising a liquid crystal compound represented by Formula (5),

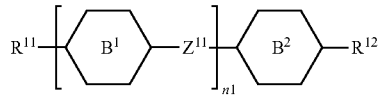

(5)

wherein $R^{11}$ and $R^{12}$ are each, independently of one another, selected from the group consisting of hydrogen, halogen, a $C_1$-$C_{15}$ straight alkyl group, a $C_3$-$C_{15}$ branched alkyl group, a $C_2$-$C_{15}$ straight alkenyl group, and a $C_3$-$C_{15}$ branched alkenyl group, wherein each of said $C_1$-$C_{15}$ straight alkyl group, said $C_3$-$C_{15}$ branched alkyl group, said $C_2$-$C_{15}$ straight alkenyl group, and said $C_3$-$C_{15}$ branched alkenyl group is unsubstituted or substituted with at least one halogen atom, and at least one —$CH_2$—group in each of said $C_1$-$C_{15}$ straight alkyl group, said $C_3$-$C_{15}$ branched alkyl group, said $C_2$-$C_{15}$ straight alkenyl group, and said $C_3$-$C_{15}$ branched alkenyl group is optionally replaced with a —O—radical, with the proviso that when at least two of said —$CH_2$— groups are replaced with said —O—radicals, said —O—radicals are not bonded to each other directly;

B¹ and B² are each, independently of one another, selected from the group consisting of 1,4-phenylene, 1,4-cyclohexylene, benzofuran-2,5-diyl, 1,3-dioxane-2,5-diyl, tetrahydropyran-2,5-diyl, a divalent dioxa-bicyclo[2.2.2]octyl functional group, a divalent trioxa-bicyclo[2.2.2]octyl functional group, and indane-2,5-diyl, wherein each of said 1,4-phenylene, said 1,4-cyclohexylene, said benzofuran-2,5-diyl, said 1,3-dioxane-2,5-diyl, and said tetrahydropyran-2,5-diyl is unsubstituted or substituted with at least one radical selected from the group consisting of halogen and a cyano group, and at least one —$CH_2$—group in each of said 1,4-phenylene, said 1,4-cyclohexylene, said benzofuran-2,5-diyl, said 1,3-dioxane-2,5-diyl, and said tetrahydropyran-2,5-diyl is optionally replaced with a fourth divalent radical selected from the group consisting of —O—, —N—, and —S—, with the proviso that when at least two of said —$CH_2$—groups are replaced with said fourth divalent radicals, said fourth divalent radicals are not bonded to each other directly;

$Z^{11}$ is selected from the group consisting of a single bond, a $C_1$-$C_4$ straight alkylene group, a $C_3$-$C_4$ branched alkylene group, a $C_2$-$C_4$ straight alkenylene group, a $C_3$-$C_4$ branched alkenylene group, a $C_2$-$C_4$ straight alkynylene group, and a $C_4$ branched alkynylene group, wherein each of said $C_1$-$C_4$ straight alkylene group, said $C_3$-$C_4$ branched alkylene group, said $C_2$-$C_4$ straight alkenylene group, said $C_3$-$C_4$ branched alkenylene group, said $C_2$-$C_4$ straight alkynylene group, and said $C_4$ branched alkynylene group is unsubstituted or substituted with at least one radical selected from the group consisting of halogen and a cyano group, and at least one —$CH_2$—group in each of said $C_1$-$C_4$ straight alkylene group, said $C_3$-$C_4$ branched alkylene group, said $C_2$-$C_4$ straight alkenylene group, said $C_3$-$C_4$ branched alkenylene group, said $C_2$-$C_4$ straight alkynylene group, and said $C_4$ branched alkynylene group is optionally replaced with a fifth divalent radical selected from the group consisting of —O— and —S—, with the proviso that when at least two of said —$CH_2$—groups are replaced with said fifth divalent radicals, said fifth divalent radicals are not bonded to each other directly; and n1 is an integer ranging from 0 to 2, provided that when n1 is 2, two B¹s are the same or different and two $Z^{11}$s are the same or different.

9. The liquid crystal composition according to claim 8, wherein said liquid crystal compound represented by Formula (5) is selected from the group consisting of a liquid crystal compound represented by Formula (5a) and a liquid crystal compound represented by Formula (5b),

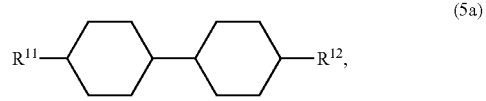

(5a)

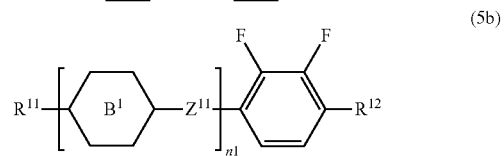

(5b)

wherein

B¹ is selected from the group consisting of 1,4-phenylene and 1,4-cyclohexylene, wherein each of said 1,4-phenylene and said 1,4-cyclohexylene is unsubstituted or substituted with at least one radical selected from the group consisting of halogen and a cyano group, and at least one —$CH_2$—group in each of said 1,4-phenylene and said 1,4-cyclohexylene is optionally replaced with said fourth divalent radical selected from the group consisting of —O—, —N—, and —S—, with the proviso that when at least two of said —$CH_2$—groups are replaced with said fourth divalent radicals, said fourth divalent radicals are not bonded to each other directly;

$R^{11}$, $R^{12}$, and $Z^{11}$ are as defined in claim 8; and n1 is an integer ranging from 1 to 2.

10. The liquid crystal composition according to claim 8, wherein said liquid crystal compound represented by Formula (5) is in an amount ranging from 20 parts by weight to 99 parts by weight based on 100 parts by weight of said liquid crystal composition.

11. A liquid crystal display, comprising the liquid crystal composition according to claim 1.

* * * * *

UNITED STATES PATENT AND TRADEMARK OFFICE
CERTIFICATE OF CORRECTION

PATENT NO. : 10,968,391 B2
APPLICATION NO. : 16/403215
DATED : April 6, 2021
INVENTOR(S) : Chih-Yuan Lo et al.

It is certified that error appears in the above-identified patent and that said Letters Patent is hereby corrected as shown below:

On the Title Page
ITEM (54)   Line 3,   change "THE SAME (II)" to --THE SAME--

In the Specification
Column 17,   Line 5,   change "two B's are" to --two $B^1$s are--
Column 18,   Line 24,   change "two B's represent" to --two $B^1$s represent--
Column 18,   Line 37,   change "B's represent" to --$B^1$s represent--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*